United States Patent [19]

Natta et al.

[11] 3,880,819
[45] Apr. 29, 1975

[54] COPOLYMERIZATES OF ETHYLENE AND/OR HIGHER ALPHA-OLEFINS WITH NON-CONJUGATED DIOLEFINS AND PROCESS FOR PRODUCING THE SAME

[75] Inventors: Giulio Natta; Giorgio Mazzanti; Alberto Valvassori, all of Milan, Italy; Guido Sartori, Roselle, N.J.

[73] Assignee: Montecatini Edison S.p.A., Milan, Italy

[22] Filed: Apr. 14, 1972

[21] Appl. No.: 244,309

Related U.S. Application Data

[63] Continuation of Ser. No. 676,017, Oct. 18, 1967, abandoned, which is a continuation-in-part of Ser. Nos. 485,933, Sept. 8, 1965, abandoned, and Ser. No. 243,728, Dec. 11, 1961, abandoned, and Ser. No. 151,206, Nov. 9, 1961, abandoned.

[30] Foreign Application Priority Data

| | | |
|---|---|---|
| Nov. 14, 1960 | Italy | 19538/60 |
| Dec. 15, 1961 | Italy | 22577/61 |
| Sept. 8, 1964 | Italy | 19286/64 |

[52] U.S. Cl. ............... 260/80.78; 260/88.2 E
[51] Int. Cl. .............. C08f 15/04; C08f 15/40
[58] Field of Search .............. 260/80.78, 88.2 E

[56] References Cited
UNITED STATES PATENTS

| | | | |
|---|---|---|---|
| 2,933,480 | 4/1960 | Gresham | 260/88.2 |
| 3,234,383 | 2/1966 | Barney | 260/80.78 |
| 3,280,082 | 10/1966 | Natta et al. | 260/88.2 |
| 3,489,733 | 1/1970 | Natta et al. | 260/80.78 |

*Primary Examiner*—Joseph L. Schofer
*Assistant Examiner*—A. Holler

[57] ABSTRACT

New and novel copolymerizates of ethylene and/or aliphatic alpha-olefins containing three to eight carbon atoms with non-conjugated diolefins containing at least one terminal unsaturation of vinyl type are disclosed.

The copolymerizates are obtained by copolymerizing non-conjugated aliphatic diolefins containing at least one vinyl unsaturation and from five to 15 carbon atoms with ethylene or with ethylene and aliphatic alpha-olefins containing three to eight carbon atoms in the liquid phase but in the absence of halogenated aliphatic hydrocarbons, with a catalyst prepared from particular vanadium compounds and alkyl aluminum halides, both the preparation of the catalyst and the copolymerization being carried out a temperature between −80°C and +10°C.

9 Claims, No Drawings

COPOLYMERIZATES OF ETHYLENE AND/OR HIGHER ALPHA-OLEFINS WITH NON-CONJUGATED DIOLEFINS AND PROCESS FOR PRODUCING THE SAME

This is a continuation of application Ser. No. 679,017, filed Oct. 18, 1967, now abandoned which in turn is a continuation-in-part of Ser. No. 485,933, filed Sept. 8, 1965, now abandoned, Ser. No. 243,728, filed Dec. 11, 1961, now abandoned and Ser. No. 151,206, filed Nov. 9, 1961, now abandoned.

More particularly, the invention provides copolymerizates of ethylene, propylene or butene-1, and the non-conjugated diolefin which are distinguished from known polymerizates obtained from mixtures of the three monomers by the following characteristics:

a. the copolymerizates consist essentially of linear, amorphous copolymers consisting of macromolecules each of which contains units of the diolefin and of both of the mono-olefins, and each of which is unsaturated, the unsaturations being contained in side groups only;

b. the copolymers of which the copolymerizates essentially consist have molecular weights above 20,000;

c. the copolymers are completely extractable with boiling n-heptane;

d. because they are essentially made up of macromolecules which are unsaturated, the copolymerizates are readily vulcanized to elastomers which are insoluble in common organic solvents, and have excellent properties and low permanent deformations at break.

The present copolymerizates are further characterized and distinguished in that most of the diene units which are contained in the copolymeric macromolecules are polymerized 1,2 and the copolymers are free from macromolecules containing, exclusively, units of the two mono-olefins.

In order to obtain the copolymers as defined above, it is essential to avoid cyclization of the non-conjugated diolefin during the copolymerization, or to at least control the extent of cyclization so that it is minimal and below the level at which satisfactory vulcanization of the copolymers would be prevented.

We found that the copolymers as defined above are obtained only by copolymerizing the starting monomers mixture in contact with selected homogeneous catalysts prepared from certain hydrocarbon-soluble vanadium compounds at temperatures between −80°C and +10°C. These particular copolymers are not obtained using temperatures above +10°C, and/or using heterogeneous catalysts comprising a solid phase insoluble in, or colloidally dispersed in, the liquid phase in which the copolymerization is effected.

The art shows the copolymerization of mixtures of ethylene, a higher alpha-olefin, and a non-conjugated diolefin in contact with heterogeneous catalysts which contain a solid phase insoluble or colloidally dispersed in the liquid phase in which the copolymerization takes place, for example, catalysts prepared from such halogenated transition metal compounds as vanadium tetrachloride, vanadyl trichloride, or titanium tetrachloride, and aluminum trialkyls or lithium-aluminum tetraalkyls.

The use of catalysts of the aforesaid type to promote the copolymerization of ethylene, an aliphatic alpha-olefin, and the non-conjugated diolefin has the following results:

1. The catalysts tend to cyclize the non-conjugated diolefin with the result that a particular kind of polymerization known as "intermolecular and intramolecular polymerization" takes place and the polymerizates obtained comprise saturated macromolecules containing a nucleus of cycloaliphatic type for each monomeric unit, which saturated macromolecules constitute an inert, undesirable diluent, and do not contribute to vulcanization of the copolymers.

2. The polymerization rate is much lower than obtainable by operating under the same conditions but in the absence of the non-conjugated diene.

3. The yields of polymerizates, even after long polymerization times, are much lower than the yields of copolymerizates (e.g., of ethylene-propylene copolymerizates) obtainable by operating in the absence of the non-conjugated diene.

4. The crude polymerization products consist of mixtures of terpolymers and copolymers, comprising also saturated copolymers of mono-olefines with each other. When such copolymerization mixtures are vulcanized using the recipes and techniques normally used for vulcanizing rubbers having low unsaturation, such as e.g., butyl rubber, they yield poorly vulcanized products which are at least partially soluble in organic solvents and have very high permanent deformations at break.

In summary, the heterogeneous catalysts and/or high temperatures tend to cyclize the non-conjugated diolefin, whereby intermolecular and intramolecular polymerization occurs, resulting in polymerizates comprising saturated macromolecules containing a cycloaliphatic nucleus in each unit derived from the non-conjugated diolefin. The saturated macromolecules constitute an undesirable diluent in the final polymerizates which is inert and does not contribute to vulcanization of the copolymers to commercially acceptable synthetic rubbers. Due to the presence of the inert diluting saturated macromolecules, the polymerization products are only difficultly sulfur-vulcanizable, at best and the vulcanizates which are obtained do not have the characteristics desired for commercially useful elastomers.

For instance, when a mixture of the monoolefins, ethylene and propylene with diallyl (hexadiene-1,5) is polymerized in contact with a heterogeneous catalyst and/or at high polymerization temperature (e.g., at room temperature or higher) the diene units cyclize in the following way:

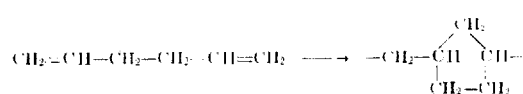

When the non-conjugated diolefin mixed with the monoolefins is one having only one terminal double bond such as, for instance, hexadiene-1,4, the diene units cyclize in the following way:

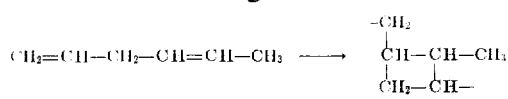

The cyclization problem which is normally encountered when heterogeneous catalysts are used is discussed in the paper of E. K. Gladding et al., published in Industrial and Engineering Chemistry, Product and Research Development, Vol. 1, No. 2, June, 1962, p. 66. The cyclization phenomenon is also referred to By C. S. Marvel and J. K. Stille, JACS, 80, pp. 1740–41.

The art also suggests polymerizing mixtures of monoolefins with non-conjugated diolefins in contact with catalysts prepared from aluminum alkyl compounds and the hydrocarbon-soluble vanadium compounds in a reaction medium consisting of a halogenated aliphatic hydrocarbon which is either carbon tetrachloride or trichloromonofluoromethane. The halogenated aliphatic hydrocarbon solvents have an adverse effect on the copolymerization because they tend to promote cyclization of the non-conjugated diolefins.

The primary objects of this invention was to inhibit cyclization of the non-conjugated diene during the polymerization reaction while at the same time avoiding use of halogenated aliphatic hydrocarbon solvents, to thus obtain the present copolymers consisting of the macromolecules each containing units of all of the starting monomers and in which practically all of the non-conjugated diene is polymerized 1,2 and the unsaturations are in side groups, which copolymers are free of saturated macromolecules containing cycloaliphatic nuclei, having a high molecular weight, and are readily sulfur-vulcanizable to insoluble elastomers having excellent properties and low deformations at break adapting the same to commercial use as general purpose synthetic rubbers.

Such object was achieved, as is apparent from the description of the present copolymerizates given herein above.

The primary object, and other objects of the invention, were accomplished by copolymerizing mixtures of the monomers under particular conditions, using specific selected catalytic systems prepared from vanadium compounds and alkyl aluminum halides.

The selected catalysts which are used for the copolymerization according to this invention are soluble in the hydrocarbons that can be used as the inert polymerization medium or diluent, such as e.g., n-heptane, benzene, toluene or mixtures thereof, and are prepared from (1) dialkyl aluminum monohalides, monoalkyl aluminum dihalides, or mixtures thereof, in which the alkyl groups contain from one to six carbon atoms, and including the fluorides, chlorides, bromides and iodides and (2) compounds of vanadium selected from acyl or halogenacylacetonates of vanadium or vanadyl and from complexes of vanadium halides or oxyhalides with linear or cyclic ethers and linear or cyclic amines.

Examples of the alkyl metal halides which are useful are dimethyl, diethyl, diisopropyl, diisobutyl, dihexyl aluminum monohalides, and the corresponding monoalkyl halides.

Vanadium compounds which are preferably used are: vanadium triacetylacetonate; vanadyl diacetylacetonate; vanadyl halo-acetylacetonates of the formulae $VOAc_2X$ or $VOAcX_2$ in which Ac represents the acetylacetonic residue and X is any halogen; vanadium benzoyl acetonate; the tetrahydrofuranates and dialkyl- (such as diethyl and diisopropyl) etherates of vanadium trichloride, tetrachloride or vanadyl trichloride; the pyridinates, aminates such as for instance trimethyl, triethyl, and dimethyl ethyl aminates, and the quinolinates of vanadium tri- and tetra- chloride and of vanadyl trichloride.

The copolymerizates are homogeneous, in the sense that each of the unsaturated macromolecules of which the copolymers consist, contains units of all of the starting monomers.

For instance, by copolymerizing a mixture of ethylene, propylene, and 1,5-hexadiene, or of ethylene, propylene and 2-methyl-1,4-pentadiene, or ethylene, propylene and 1,4-hexadiene, according to the conditions of the process which is an object of the present invention, a crude copolymerization product is obtained which consists of macromolecules each containing monomeric units of ethylene, propylene and the non-cyclized diolefin. Furthermore, the non-cyclized diolefin units are homogeneously distributed along the macromolecular chains.

The homogeneity of the copolymerizates obtained according to the present process is demonstrated by the fact that they can be vulcanized by employing the mixes and the techniques normally used for vulcanizing unsaturated rubbers, preferably unsaturated rubbers having low unsaturation such as butyl rubber.

The vulcanized products thus obtained are completely insoluble in organic solvents and are only swollen to a limited extent by some of them. Moreover, the vulcanized rubbers thus obtained have very good mechanical strength and very limited permanent deformation at break (see, e.g., the results of the mechanical tests carried out on the vulcanized products reported in Example 1 below).

Non-conjugated diolefins which are suitable for obtaining the copolymerizates of the present invention contain from five to 15 carbon atoms and include:

1,4-pentadiene
2-methyl-1,4-pentadiene
2-methyl-1,5-hexadiene
2-phenyl-1,5-hexadiene
1,4-hexadiene
1,4-heptadiene
1,5-hexadiene
1,5-heptadiene
1,5-octadiene
5-methyl-1,6-heptadiene
2-methyl-1,6-heptadiene
1,6-heptadiene
3,5-dimethyl-1,7-octadiene
3,7-dimethyl-1,6-octadiene
3,6-dimethyl-1,6-octadiene.

It was noted above that the catalysts prepared from such halogenated transition metal compounds as vanadium tetrachloride, titanium tetrachloride or vanadyl trichloride and e.g., an aluminum trialkyl, tend to cyclize the non-conjugated diolefin during the copolymerization to produce copolymers consisting prevailingly of saturated macromolecules in which the diene units are cyclized.

This is shown by examination of the product obtained by polymerizing a mixture of ethylene, propylene and 2-methyl-hexadiene-1,5, or a mixture of ethylene, propylene and heptadiene-1,5, in contact with a catalyst based on vanadyl trichloride and aluminum triisobutyl, under different temperature conditions.

The catalyst systems used in the present process polymerize the non-conjugated dienes by a different mechanism which does not result in cyclization of the diene, or if cyclization of the diene does occur, it does so to an extent insufficient to prevent the ready and satisfactory vulcanization of the copolymerizate.

Substantially all of the diene units in each of the macromolecules of the present copolymerizates are polymerized 1,2 and only a minor amount, if any, of the starting diene is found to exist in the copolymer macromolecules in the form of cycles. Each of the copolymerized non-cyclic units of the diolefin in the macromolecules contains a double bond in the side group. Such macromolecules are both structurally and chemically different from the saturated macromolecules in which a prevailingly proportion of the polymerized diolefin units are cyclic and which exist as inert diluent in the polymerizates obtained according to the prior art, as discussed above.

The structure of the present copolymerizates was determined by infra-red analysis. The IR spectra showed (in the case of an alpha-omega diolefin) absorption bands indicating the presence of vinyl or vinylidene bonds pendant from the chains, due to the presence of units of non-cyclized diene, one of the double bonds of which does not take part in the copolymerization and is available for the vulcanization.

The structural and other differences between the present copolymerizates and those obtained with the aid of catalysts based on, for instance, vanadyl trichloride and an aluminum trialkyl such as aluminum triisobutyl, are apparent from an examination of a copolymerizate prepared from, for example, ethylene, propylene and 2-methyl-hexadiene-1,5 with the aid of the catalyst prepared from vanadyl trichloride, and an examination of a copolymerizate obtained by copolymerizing ethylene, propylene and 2-methyl-hexadiene-1,5 under the same conditions except that the catalyst is prepared from vanadium triacetylacetonate and diethyl aluminum chloride.

For instance, the IR spectrum for an ethylene-propylenediallyl terpolymerizate containing 2.5 percent by mols of diene obtained by the present process shows both an absorption band due to unsaturation at about 6.0 microns and a band at 11.0 microns attributable to vinyl double bonds. Furthermore when the terpolymerizate is vulcanized, e.g., with a mix suitable for vulcanizing butyl rubber, the obtained vulcanized product shows values for the permanent deformation at break lower than about 8 percent.

These results show that the hexadiene is copolymerized, at least prevailingly, with 1,2-enchainment and that the diene units are homogeneously distributed in the macromolecules.

Similarly, in the infra-red spectrum of terpolymerizates containing 2 to 4 percent by mols of 2-methyl-1,5-hexadiene, obtained by the present process, an absorption at 11.25 microns can clearly be observed, which can be ascribed in vinylidene double bonds. The terpolymerizate is vulcanizable to a very satisfactory rubber. The infra-red spectrum of ethylene/propylene/-2-methyl-octadiene-1,7 obtained by the practice of this invention, shows the presence of an absorption at about 11.25 microns, attributable to double bonds of vinylidenic type.

The composition of macromolecules of the present copolymerizates (terpolymerizates) of ethylene, propylene or butene-1, and a non-conjugated diolefin as shown C. can be established by subjecting the copolymerizates to careful fractionation. Careful fractional precipitation of the ethylene-propylene-diolefin copolymerizates and examination of the fractions showed that all of the fractions were amorphous, all contained units of ethylene, propylene and the non-conjugated diolefin, and all were unsaturated. The latter characteristic established that the macromolecules contained units of the diene which were not cyclized.

The process of the present invention can be carried out at temperatures comprised between −80°C and +10°c.

In order to obtain copolymers having the best characteristics and high yields of copolymerizate per weight unit of catalyst, it is desirable to carry out both the preparation of the catalyst and the copolymerization at temperatures comprised between 0°C and −80°C, preferably between −10°C and −50°C. When these conditions are observed, the catalysts show a much higher activity than the same catalytic systems prepared and used at higher temperatures. Moreover, by operating in the aforementioned temperature range, the activity of the catalysts remains practically unaltered with time.

The activity of the catalysts employed in the process herein described varies with the molar ratio between the compounds used in preparing the catalyst. We have found that, when using, e.g., diethyl aluminum monochloride and vanadium triacetylacetonate, it is convenient to use catalysts in which the $AlR_2Cl$ to vanadium compound molar ratio is comprised between 2 and 30, preferably between 4 to 20. This ratio, is in fact, general for the alkyl aluminum halides and vanadiuum compounds disclosed herein.

The copolymerization which is an object of the present invention can be carried out in the presence of an inert hydrocarbon solvent consisting, e.g., of butane, pentane, n-heptane, toluene, xylene or mixtures thereof.

Particularly high yields of the new amorphous copolymerizates can be obtained if the copolymerization is carried out in absence of an inert solvent, using the monomers in the liquid state i.e., using an ethylene solution in a mixture of higher alpha-olefin and non-conjugated diolefin to be copolymerized, kept in the liquid state.

In order to obtain copolymerizates having a high homogeneity of composition, it is desirable to operate so as to keep constant, or as constant as possible during the copolymerization, the ratio between the concentration of the monomers to be copolymerized, which are present in the reacting liquid phase. For this purpose, it can be convenient to carry out the copolymerization continuously by feeding and discharging continuously a mixture of the monomers having constant composition and by operating with high flow rates.

The catalytic system used can be prepared in absence of the monomers, or the catalyst components can be mixed in the presence of the monomers to be copolymerized. The catalyst components in the predetermined molar ratios can be fed continuously during the polymerization.

By varying the composition of the mixtures of monomers, it is possible to vary the composition of the copolymers within wide limits.

When copolymers of ethylene with a non-conjugated diene, such as, e.g., 1, 5-hexadiene or 2-methyl-1,4- pentadiene are prepared, in order to obtain amorphous materials having elastomeric properties and avoid the occurrence of long ethylene sequences exhibiting crystallinity, the mixture of the monomers must be regulated so as to obtain copolymerizates having a relatively high diene content, and preferably a diene content of from 20 to 70 percent by mols.

When copolymers of 3 monomers, one of which is ethylene, are to be produced, such as, e.g., copolymerizates of ethylene, propylene and 1,5-hexadiene, or copolymerizates of ethylene, 1-butene and 2-methyl-1,5-hexadiene, the amount of diene in the terpolymer macromolecule can be from 1 to 20 percent by mols. The copolymers thus produced can be vulcanized by the methods normally used for unsaturated rubbers and still maintain the characteristics of high resistance to ageing and to oxidation which are peculiar to elastomers consisting of substantially saturated copolymers.

By employing the process which is an object of the present invention, it is thus possible to produce new crude unsaturated copolymerizates (including terpolymerizates) having very desirable elastomeric properties, and which can be vulcanized by the methods normally used in the rubber industry.

Each monomer feed is specific and the relative amounts of the comonomers in the feed required to produce a two-component or a three-component copolymerizates having the content of non-conjugated diolefin sufficient to render the copolymerizate vulcanizable depends on the reactivity ratios of the particular monomers used.

To obtain the copolymerizates consisting essentially of the unsaturated vulcanizable terpolymers of ethylene, propylene or butene-1, and the non-conjugated diolefin which are amorphous at the X-rays, using the present catalysts and process, the molar ratio of propylene to ethylene in the reacting liquid phase must be at least 4:1, and the molar ratio of butene-1 to ethylene in the reacting liquid phase must be at least 25:1. The amount of the diene added is then determined empirically to result in the desired diolefin content for the copolymerizate, and will depend on the specific non-conjugated diolefin used. The diene content of the terpolymers may be, as stated, from 1 to 20 percent by mols, preferably from 2 to 10 percent by mols, and the minimum amount needed to insure a satisfactory unsaturation of the macromolecules for ready vulcanization of the mass will do.

In general the double bonds are distributed in the macromolecules of the terpolymerizates in such a homogeneous way as to render the crude terpolymerizates easily vulcanizable by means of the ingredients and under the conditions normally used in the rubber industry, even if the content of double bonds is as low as 1 to 3 per 100 total monomeric units.

The copolymers of the invention are completely extractable with boiling n-heptane, in contrast to the vulcanizates which are completely insoluble in boiling n-heptane.

The copolymers have very high molecular weights, always in excess of 20,000 corresponding to an intrinsic viscosity in excess of 0.5 as determined in tetrahydronaphthalene at 135°C or in toluene at 30°C, and generally higher than 50,000.

In fact, the molecular weight of the present copolymers made up of the unsaturated macromolecules in which the non-conjugated diolefin is polymerized 1, 2 have such high molecular weights it may be desirable to regulate the molecular weight during the copolymerization reaction so that, for more ready processing, the copolymers will have a molecular weight lower than that of the copolymers normally produced under our conditions.

For instance, the copolymerization can be carried out in the presence of specific organometallic compounds which tend to curtail the degree of polymerization such as, for instance, zinc dialkyls, or by including small amounts of hydrogen in the copolymerizing system.

The term "diolefin containing at least one terminal unsaturation of vinyl type" includes diolefins containing two terminal double bonds of vinyl type; diolefins containing an inner double bond and a terminal double of the vinyl type; and diolefins containing a terminal double bond of vinylidenic type and a terminal double bond of vinyl type.

As disclosed, the starting monomers may be ethylene and/or an aliphatic alpha-olefin as defined herein and at least one linear non-conjugated diolefin having only one terminal double bond of vinyl type; both the catalyst preparation and the copolymerization can be carried out at temperatures between +10°C and −80°C, preferably between −10° and −50°C; and the copolymerization can be carried out in the absence of inert solvents, by using the monomers mixture maintained in the liquid state as the copolymerization medium.

When the copolymerization is carried out at a sufficiently low temperature in the stated range, e.g., below −50°C when the monomers are ethylene, propylene and 1,4-hexadiene, it is unnecessary to operate under pressure higher than atmospheric pressure in order to maintain the monomers mixture in the liquid state. Somewhat increased pressures may be employed when the temperature is near the aforementioned upper limit of +10°C.

By operating under the conditions just described, there are obtained very homogeneous products which are substantially entirely free of cross-links, completely soluble in boiling n-heptane, and capable of being vulcanized to elastomers having very good mechanical characteristics. Due to the high monomers concentration and the fact that the catalysts used in the practice of this invention do not lose their activity with time when used at low temperatures, the copolymerizates produced under the last-described operating conditions are obtained in particularly high yields.

Since the copolymer formed is scarcely soluble, or is substantially insoluble, in the reaction medium consisting essentially of the monomers mixture (ethylene and/or the aliphatic alpha-olefin and the linear non-conjugated diolefins having only one terminal double bond of the vinyl type) maintained in the liquid state used as the copolymerization medium, there is no appreciable increase in the viscosity of the reacting mass during the copolymerization and, therefore, no appreciable decrease in the copolymerization rate due to difficulties of mass tranfer.

Elastomers obtained by vulcanizing amorphous copolymerizates according to this invention have the properties of high resistance of ageing and oxidation which are characteristics of elastomers consisting of substantially saturated copolymers. The vulcanized products can be used advantageously in the production of various manufactured articles, including sheets, elastic yarns, tubes, tires etc.

The following examples are given to illustrate details of the invention, without limiting its scope.

EXAMPLE I

The reaction apparatus consists of a large tube having a capacity of 750 ml and a diameter of 5.5 cm, provided with a tube for charging and discharging the gases, a mechanical agitator and a thermometer sheath. The tube for introducing the gases reaches the bottom of the test tube and ends with a porous diaphragm (diameter 3.5 cm).

The apparatus is kept at the constant temperature of −20°C, 350 cc of anhydrous n-heptane are introduced and this solvent is saturated at −20°C by passing through it a mixture containing propylene and ethylene in a molar ratio of 4:1, with a flowrate of 200 Nl/h, 0.168 mols (20cc) 1,5-hexadiene (diallyl) are then introduced.

Meanwhile, the catalyst is prepared at −20°C by mixing a solution of 14 millimols diethyl aluminum monochloride in 20 cc anhydrous toluene with a solution of 2.8 millimols vanadium triacetylacetonate in 20 cc toluene.

The catalyst is introduced into the reaction apparatus approximately 1 minute after its preparation. The feeding of the ethylene-propylene mixture is continued with a flowrate of 300 Nl/h.

7 minutes after the introduction of the catalyst, further 0.067 mols (80cc) 1,5-hexadiene (diallyl) are introduced into the reaction apparatus.

12 minutes after the introduction of the catalyst, the reaction is stopped by the addition of 20 cc methanol containing 0.2 g of antioxidant (phenylnaphthylamine).

The product is purified in a nitrogen atmosphere by successive treatments with aqueous hydrochloric acid and water. The product is then completely coagulated by the addition of an excess of an acetone-methanol mixture. The product, dried under vacuum, amounts to 25 g of a white solid, having a rubbery aspect, which is found to be completely amorphous by X-ray examination.

It has an intrinsic viscosity, determined in tetrahydronaphthalene at 135°C, of 3.0 and is completely extractable with boiling n-heptane.

The infra-red spectrum of said product shows the bands of the unsaturation at about 6.08 microns and bands at 10 microns and 11 microns which show the presence of vinyl double bonds.

The presence of a flex at 6.9 microns indicates that only a small portion of the 1,5-hexadiene monomeric units are copolymerized with cyclization.

From the examinaton of the infra-red spectrum it can be concluded that this copolymer contains about 9–10 percent by weight of 1,5-hexadiene.

100 p by weight of the ethylene-propylene-diallyl terpolymerizate are mixed in a laboratory roll mill with 1 part phenyl, -β-naphthylamine, 2 parts lauric acid, 5 parts zinc oxide, 2 parts sulfur, 1 part tetramethylthiuram disulfide and 0.5 parts mercaptobenzothiazole.

The mixture obtained is vulcanized in a press for 30 minutes at 150°C, obtaining a vulcanized lamina having the following characteristics:

| | |
|---|---|
| tensile strength | 43 kg/cm$^2$ |
| elongation at break | 330% |
| modulus at 300% elongation | 24 kg/cm$^2$ |
| permanent set after break | 4% |
| Shore hardness, A scale | 57 |
| rebound elasticity at 25°C | 65% |

If, in addition to the afore-mentioned ingredients, 50 parts HAF carbon black are added and the mix is vulcanized under the same conditions, the following characteristics are obtained:

| | |
|---|---|
| Tensile strength | 250 kg/cm$^2$ |
| Elongation at break | 460% |
| Modulus at 300% | 140 kg/cm$^2$ |
| Permanent set at break | 20% |
| Shore hardness, A scale | 77 |
| Rebound elasticity at 25°C | 48% |

EXAMPLE II

The copolymerization is carried out under the conditions of Example I, but 1,4-hexadiene is used as a comonomer instead of diallyl.

4 cc 1,4-hexadiene are introduced into the reaction apparatus containing 200 cc n-heptane saturated at −20°C with a gaseous propylene-ethylene mixture in the molar ratio of 4:1.

The catalyst is prepared as described in Example I. Of this catalyst there is used an amount equal to one fourth of that in Example I. 15 minutes after the catalyst introduction, the reaction is stopped by the addition of 20 cc methanol containing 0.2 g of an antioxidant (phenylnapthylamine).

The product, purified and isolated as described in Example I, amounts to 24 g of a white solid having a rubbery appearance, amorphous by X-ray examination. In the infra-red spectrum are clearly visible the bands of the unsaturations at about 10.35 microns due to trans unsaturations. The diene amount is 3.7 percent by weight.

100 parts by weight of the ethylene-propylene-1,4-hexadiene terpolymerizate are mixed in a laboratory roll mill with 50 parts HAF black 1 part phenylnapthlamine, 2 parts lauric acid, 5 parts zinc oxide, 2 parts of sulfur, 1 part tetramethylthiuram disulfide and 0.5 parts mercaptobenzothiazole.

The mix thus obtained is vulcanized in a press for 60 minutes at 150°C, obtaining a vulcanized lamina having the following characteristics:

| | |
|---|---|
| tensile strength | 170 kg/cm$^2$ |
| elongation at break | 380% |
| modulus at 300% elongation | 128 kg/cm$^2$ |
| permanent set at break | 6% |

EXAMPLE III

The copolymerization is carried out under the conditions of Example I but 2-methyl-1,5-hexadiene is used as a comonomer instead of diallyl.

0.09 mols (12cc) 2-methyl-1,5-hexadiene are introduced into the reaction apparatus containing 350 cc n-heptane saturated at −20°C with a gaseous propylene-ethylene mixture in the molar ratio of 4:1. The catalyst is prepared as described in Example I.

Twenty minutes after the introduction of the catalyst, the reaction is stopped by addition of 20 cc methanol containing 0.2 g of antioxidant (phenylnapthylamine).

The product, purified and isolated as described in Example I, amounts to 29 g of a white solid having a rubbery appearance, amorphous by X-rays examination.

100 parts by weight of the ethylene-propylene-2-methyl-1,5-hexadiene terpolymerizate are mixed in a laboratory roll mill, with 1 part of phenyl- β-napthylamine, 2 parts lauric acid, 5 parts zinc oxide, 2 parts sulfur, 1 part tetramethylthiuram disulfide and 0.5 parts mercaptobenzothiazole. The mix is then vulcanized in a press for 30 minutes at 150°C obtaining a vulcanized lamina presenting the following characteristics:

| | |
|---|---|
| tensile strength | 28 kg/cm² |
| elongation at break | 760% |
| modulus at 300% elongation | 7 kg/cm² |
| set at break | 20% |

EXAMPLE IV 50 cc n-heptane are introduced into a 250 cc glass flask provided with a mechanical agitator, a tube for introducing and discharging the gases and a thermometric sheath, kept at the constant temperature of −20°C. After having saturated this solvent at −20°C with ethylene, 0.084 mols (10cc) 1,5-hexadiene (diallyl) are introduced.

At the same time, the catalyst is prepared at −20°C by mixing a solution of 14 millimols of diethyl aluminum monochloride in 20 cc anhydrous toluene with a solution of 2.8 millimols vanadium triacetylacetonate in 20 cc toluene.

The catalyst thus prepared is introduced into the reaction apparatus after about 30 seconds. The feeding of ethylene is continued with a flowrate of 200 Nl/h.

Ten minutes after having introduced the catalyst, the reaction is stopped by addition of 20 cc of methanol containing 0.1 g of an antioxidant (phenylnaphthylamine).

The product is purified by successive treatments under nitrogen with aqueous hydrochloric acid and water and is then coagulated with an acetone methanol mixture.

7 g of a solid rubbery product which is found to be amorphous by X-ray examination are obtained. Since crystallinity of polyethylene type is completely absent, it is evident that the 1,5-hexadiene copolymerized with ethylene.

In the infra-red absorption spectrum are clearly visible the bands at 6.08 microns and 11 microns, which can be ascribed to the presence of vinyl double bonds. An absorption at 6.9 microns, attributable to cyclopentanic nuclei is also present.

The ratio between the intensities of the band at 6.9 microns and the intensities of the bands due to vinyl groups indicates that most of the 1,5-hexadiene is co-polymerized with 1,2-enchainment.

EXAMPLE V

The copolymerization is carried out under the same conditions as in Example I, but vanadyl diacetylacetonate is used instead of vanadium tri-acetylacetonate in the preparation of the catalyst.

0.067 mols (9cc) 1,5-hexadiene (diallyl) are introduced into the reaction apparatus containing 350 cc n-heptane saturated at −20°C with a gaseous propylene-ethylene mixture in the molar ratio of 4:1.

The catalyst is prepared at −20°C by mixing a solution of 14 millimols diethyl aluminum monochloride in 20 cc anhydrous toluene with a solution of 2.8 millimols vanadyl diacetylacetonate in 20 cc toluene and is introduced into the reaction apparatus 30 seconds after its preparation.

Eight minutes after having introduced the catalyst, 0.033 mols (4cc) 1,5-hexadiene (diallyl) are added.

After 10 minutes, an amount of catalyst equal to the initial one and prepared as described above is added.

After 15 minutes, further 0.017 mols (2cc) of 1,5-hexadiene (diallyl) are added. After 30 minutes, the reaction is stopped by adding 20 cc methanol.

The product is purified and isolated as described in Example I.

28 g of ethylene-propylene-1,5-hexadiene terpolymerizate, which is solid, of rubbery appearance and amorphous by X-ray examination, are obtained.

In the infrared spectrum of this product are clearly visible the unsaturation bands at 6.08 microns and those due to the presence of vinyl double bonds at 11 microns.

The product thus obtained has an intrinsic viscosity, determined in tetrahydronaphthalene at 135°C, of 2.0 and leaves no residue when extracted with boiling n-hexane.

EXAMPLE VI

The copolymerization is carried out under the same conditions as in Example I, but 1,4-pentadiene is used as a comonomer instead of diallyl.

0.098 mols (10cc) of 1,4-pentadiene are introduced into the reaction apparatus containing 350 cc of n-heptane saturated at −20°C with a gaseous propylene-ethylene mixture in the molar ratio of 4:1.

The catalyst is prepared at −20°C by mixing a solution of 14 millimols diethyl aluminum monochloride in 20 cc anhydrous toluene with a solution of 2.8 millimols vanadium triacetylacetonate in 20 cc toluene.

After 20 minutes, an amount of catalyst equal to the initial one is added.

After 45 minutes, the reaction is stopped by adding 20 cc methanol containing 0.2 g antioxidant (phenylnaphthylamine).

The product is purified and isolated as described in Example I.

18 g of ethylene-propylene-1,4-pentadiene terpolymerizate, which is a solid with a rubbery appearance and amorphous by X-ray examination, are obtained.

In the infrared spectrum of this product are clearly visible the unsaturation bands at 6.08 microns and those due to the presence of vinyl type double bonds at 11 microns, and at about 10 microns.

The crude terpolymerizate is vulcanized by using a recipe as described in Example 3, and operating under the same conditions. A vulcanized lamina having the following characteristics is thus obtained:

| | |
|---|---|
| tensile strength | 30 kg/cm² |
| elongation at break | 600% |
| set at break | 20% |

EXAMPLE VII

The reaction apparatus described in Example I is employed; the temperature is kept at −20°C; 350 cc n-heptane and 20 cc radioactive 2-methyl-1,4-pentadiene are introduced in the glass cylinder; the solution is saturated by bubbling through it, with a flowrate of 200 Nl/h, a gaseous propylene-ethylene mixture containing the olefins in a propylene to ethylene molar ratio 3:1.

The catalyst is prepared at −20°C, under nitrogen, by admixing a solution of 1.4 millimols vanadium triacetylacetonate in 20 cc anhydrous toluene with a solution of 7 millimols aluminum diethyl monochloride in 20 cc anhydrous toluene. The catalyst thus prepared is kept at −20°C for 5 minutes and then injected in the reaction apparatus under nitrogen pressure.

The gas mixture is now circulated at the rate of 400 l/h. 12 minutes after the addition of the catalyst another 5 cc radioactive 2-methyl-1,4-pentadiene are added. After 30 minutes from the addition of the catalyst the reaction is stopped by adding 20 cc methanol containing 0.2 g phenyl-beta-naphthylamine. The polymer is purified and separated as described in Example I.

After drying in vacuo, 12 g of a solid product, amorphous at the X-rays, and having the appearance of unvulcanized rubber are obtained.

By radiochemical analysis the product is found to contain 7.1 percent by weight of 2-methyl-1,4-pentadiene. The infrared spectrum shows the presence of vinylidene groups (bands at 11.2 microns). The intrinsic viscosity, in toluene at 30°C, is 2.11.

Part of the terpolymer is fractionated, by precipitation with the aid of methanol from a carbon tetrachloride solution.

The polymer rich phases, which constitute the top layer, are separated, after about 20 hours rest in a thermostat at 30°C, by siphoning the underlying solution. The thus obtained fractions are dissolved in benzene, precipitated and washed with methanol and dried in vacuo at room temperature to constant weight.

For each fraction the content of 2-methyl-1,4-pentadiene is determined, by radiochemical analysis, and the intrinsic viscosity, in toluene at 30°C.

| Fraction No. | % of polymer precipitated | 2-methyl-1,4-pentadiene % by weight | [N], in toluene at 30°C |
|---|---|---|---|
| 1 | 20.8 | 7.1 | 3.59 |
| 2 | 29.5 | 7.2 | 3.07 |
| 3 | 37.7 | 7.2 | 2.71 |
| 4 | 46.4 | 7.2 | 2.33 |
| 5 | 58.5 | 7.2 | 2.01 |
| 6 | 65.0 | 6.9 | 1.70 |
| 7 | 70.0 | 6.6 | 1.38 |
| 8 | 76.0 | 6.9 | 1.16 |
| 9 | 82.6 | 7.2 | 1.03 |
| 10 | 91.5 | 7.2 | — |

As shown in the table, the distribution of the diene units in the various fractions is very homogeneous.

EXAMPLE VIII 350 cc anhydrous n-heptane are saturated, at −20°C, in the apparatus of Example 1, with a gaseous propylene-ethylene mixture, with a propylene to ethylene molar ratio of 4:1; 20 cc 2-methyl-1,4-pentadiene are added.

The catalyst is prepared at −20°C by admixing a solution of 14 millimols aluminum diethyl monochloride in 20 cc anhydrous toluene with 2.8 millimols of the tri-(tetrahydrofuranate) of vanadium trichloride in 20 cc anhydrous toluene; it is injected in the reaction apparatus 30 seconds after its preparation.

After 20 minutes from the addition of the catalyst the reaction is stopped by adding 20 cc methanol containing 0.2 g phenyl-beta-naphthylamine. The polymerizate is purified and separated as described in Example I.

15 g of a solid, rubbery ethylene-propylene-2-methyl-1,4-pentadiene terpolymerizate are obtained, which is amorphous at the X-rays and completely soluble in boiling n-hexane.

At the infrared the product clearly shows the band at about 11.2 microns, ascribed to vinylidene double bonds.

100 parts by weight of the polymerizate are mixed in a laboratory mill with 1 part phenyl-beta-naphthylamine, 2 parts lauric acid, 5 parts zinc oxide, 2 parts sulfur, 1 part tetramethylthiuram disulphide, 0.5 parts mercaptobenzothiazole.

The mix is vulcanized in a press for 30 minutes at 150°C: specimens of the vulcanizate, when tested at 25°C according to ASTM D-412-51T, give the following data:

| | |
|---|---|
| tensile strength | 38 kg/cm² |
| elongation at break | 520% |
| modulus at 300% | 15.6 kg/cm² |
| set at break | 10% |

EXAMPLE IX

The reaction apparatus consists of a 1,000 cc glass cylinder provided with a tube for introducing and discharging the gases a mechanical agitator and a thermometer sheath.

The tube for introducing the gases reaches the bottom of the cylinder and ends with a porous diaphragm. The apparatus is kept at the constant temperature of −20°C; 700 cc of anhydrous n-heptane are introduced and this solvent is then saturated at −20°C by passing through it an ethylene-propylene-hydrogen mixture containing 0.5 percent of hydrogen and propylene and ethylene in a molar ratio of 4:1, with a flowrate of 200 l/h. 10 cc of 2-methyl-1,5-hexadiene are then introduced. Meanwhile the catalyst is prepared at the temperature of −20°C, by mixing a solution of 14 millimols of aluminum diethyl monochloride in 20 cc of anhydrous toluene with a solution of 2.8 millimols of vanadium triacetylacetonate in 20 cc of toluene.

The catalyst is introduced into the reaction apparatus, one minute after its preparation. The ethylene-propylene mixture is fed continuously with a flowrate of 300 l/h. Twenty minutes after the introduction of the catalyst the reaction is stopped by addition of 20 cc methanol containing 0.2 g of an antioxidant (phenyl-beta-naphthylamine).

The product is purified and isolated as described in Example I. The product dried under vacuum amounts of 25 g of a white solid, having a rubbery appearance, which is found to be completely amorphous by X-ray examination. It has an intrinsic viscosity in toluene at 30°C at 2.06 and is completely extractable with boiling n-hexane. By examining the infra-red spectrum (band at 11.20 microns) this terpolymer contains 1.75 percent by weight of 2-methyl-1,5-hexadiene.

The results of this run are reported in Table I, run 1.

By operating in the same manner but using increasing amounts of 2-methyl-1,5-hexadiene in the feed mixture, the results reported in Table I, runs 2 to 6, are obtained.

TABLE I

| Run | 2-methyl-1,5-hexadiene introduced cc | Polymerization time minutes | Terpolymer obtained g | [η] | Percent by weight of 2-methyl-1,5-hexadiene in terpolymer |
|---|---|---|---|---|---|
| 1 | 10 | 20 | 25 | 2.06 | 1.75 |
| 2 | 20 | 32 | 20 | 1.96 | 3.32 |
| 3 | 25 | 25 | 15 | 1.63 | 3.90 |
| 4 | 30 | 32 | 22 | 1.74 | 4.86 |
| 5 | 40 | 30 | 25 | 1.62 | 5.75 |
| 6 | 60 | 45 | 20 | 1.80 | 7.70 |

The ethylene-propylene-2-methyl-1,5-hexadiene terpolymers obtained in runs 1 to 6 are vulcanized in a press at 150°C for 30 minutes, using the following mix:

| | |
|---|---|
| terpolymer | 100 parts by weight |
| zinc oxide | 5 parts by weight |
| stearic acid | 2 parts by weight |
| mercaptobenzothiazole | 0.5 parts by weight |
| antioxidant (phenyl-beta-naphthylamine) | 1 part by weight |
| sulfur | 2 parts by weight |
| tetramethylthiuram di-sulfide | 1 part by weight |

From sheets obtained after vulcanization, specimens to be used for the ASTM D-412 test are prepared.

The results obtained in this test are reported in Table II. If, in addition to the aforementioned ingredients, 50 parts of HAF carbon black are added and the mix is vulcanized under the same conditions, specimens having the characteristics reported in Table III are obtained.

lyst the reaction is stopped by addition of 20 cc methanol containing 0.2 g of antioxidant (phenyl-beta-naphthyl-amine).

The product is purified and isolated as described in Example I, amounts to 20 g of a white solid which has a rubbery appearance, and is shown to be amorphous by X-ray examination.

By infra-red spectrography, a 2-methyl-1,4-pentadiene content of 5.1 percent is determined in the terpolymer.

The intrinsic viscosity of the terpolymer, determined in toluene at 30°C, is 1.65.

100 parts by weight of ethylene/propylene/2-methyl-1,4-pentadiene are mixed in a laboratory roll mixer with one part phenyl-beta-naphthyl-amine, 2 parts lauric acid, 5 parts zinc oxide, 2 parts sulfur, one part tetramethylthiuram disulfide and 0.5 parts mercaptobenzothiazole.

TABLE II

| Run | % by weight of 2-methyl-1,5-hexadiene | tensile strength kg/cm² | elongation at break % | modulus at 300% elongation kg/cm² | set at break elongation | shore hard-A scale | rebound elasticity at 20°C % |
|---|---|---|---|---|---|---|---|
| 1 | 1.75 | 60 | 750 | 10.5 | 20 | 55 | 76 |
| 2 | 3.32 | 21 | 550 | 10.0 | 15 | 53 | 75 |
| 3 | 3.90 | 24 | 510 | 11.8 | 10 | 49 | 66 |
| 4 | 4.86 | 33 | 465 | 14.5 | 8 | 55 | 76 |
| 5 | 5.75 | 34 | 460 | 15.2 | 5 | 56 | 80 |
| 6 | 7.70 | 25 | 325 | 21.5 | 4 | 58 | 80 |

TABLE III

| Run | % by weight of 2-methyl-1,5-hexadiene in the terpolymer | tensile strength kg/cm² | elongation at break % | modulus at 300% elongation kg/cm² | shore hard-A scale | rebound elasticity at 20°C % |
|---|---|---|---|---|---|---|
| 1 | 1.75 | 175 | 590 | 47 | 75 | 55 |
| 2 | 3.32 | 240 | 620 | 71 | 73 | 53 |
| 3 | 3.90 | 224 | 530 | 89 | 71 | 45 |
| 4 | 4.86 | 230 | 430 | 120 | 75 | 54 |
| 5 | 5.75 | 227 | 400 | 154 | 74 | 54 |
| 6 | 7.70 | 191 | 280 | — | 78 | 54 |

EXAMPLE 10

The run is carried out under the conditions of Example 9 but 2-methyl-1,4-pentadiene is used as comonomer instead of 2-methyl-1,5-hexadiene.

Into the reaction apparatus containing 700 cc of n-heptane saturated at the temperature of −20°C with a gaseous propylene-ethylene-hydrogen mixture, having the same composition as that of Example 9, 30 cc of 2-methyl-1,4-pentadiene are introduced.

The catalyst is prepared as described in the preceding example, 50 minutes after the introduction of the catalyst The mixture is then vulcanized in a press for 30 minutes at 150°C thus obtaining a vulcanized lamina having the following characteristics:

| | |
|---|---|
| tensile strength | 27.1 kg/cm² |
| elongation at break | 515% |
| modulus at 300% elongation | 14.1 kg/cm² |
| set at break | 8% |

EXAMPLE 11

Into a 6,000 cc stainless steel autoclave provided with a mechanical stirrer and kept at −15°C, 2.8 liters of liquid propylene and 1.150 liters of 2-methyl-1,4-pentadiene are introduced.

The liquid is saturated with ethylene while keeping the pressure in the autoclave at 3.6 atm. The catalyst is introduced into the autoclave by feeding continuously a solution of aluminum diethyl monochloride in heptane and, also continuously, a toluene solution of vanadium triacetylacetonate, so that in the autoclave the molar ratio of $Al(C_2H_5)_2Cl$ to $VAc_3$ is always comprised between 5 and 8. In total, 0.96 g vanadium triacetylacetonate are introduced into the autoclave. After 2 hours and 45 minutes the autoclave is opened, gases are vented, and the product is dried under reduced pressure.

360 g of the white solid product amorphous at the X-rays, having the appearance of a non-vulcanized elastomer, are obtained. The product is completely extractable with boiling n-hexane. In the infra-red spectrum of this product, the bands visible at 11.20 microns show the presence of double bonds of vinylidenic type.

From the infra-red spectrum this terpolymer contains about 6.2 percent by weight of 2-methyl-1,4-pentadiene.

100 parts by weight of this ethylene-propylene-2-methyl-1,4-pentadiene terpolymer are mixed in a laboratory roll mixer with one part phenyl-beta-naphthylamine, 2 parts stearic acid, 5 parts zinc oxide, 0.5 parts mercaptobenzothiazole, one part tetramethylthiuram disulfide and 2 parts sulfur.

The mix is vulcanized in a press at 150°C for 30 minutes thus obtaining a vulcanized lamina having the following characteristics:

| | |
|---|---|
| tensile strength | 26 kg/cm² |
| elongation at break | 370% |
| set at break | practically nil |
| modulus at 300% elongation | 23 kg/cm² |

If, in addition to the mentioned ingredients, 50 parts of HAF carbon black are added, vulcanization carried out under the same conditions results in a product showing the following characteristics:

| | |
|---|---|
| tensile strength | 105 kg/cm² |
| elongation at break | 405% |
| modulus at 300% | 127 kg/cm² |
| set at break | practically nil |

EXAMPLE XII

In the autoclave of the preceding example kept at −15°C, 2.8 liters of liquid propylene and 1.15 liters of 2-methyl-1,4-pentadiene are introduced.

The liquid is saturated with ethylene by keeping the autoclave under a pressure of 2.9 atm gauge. The catalyst is introduced with the modalities of Example XI. In total 1.08 g of vanadium triacetylacetone are introduced.

After 2 hours and 30 minutes the autoclave is opened, the gases vented and the product obtained is dried under reduced pressure.

180 g of a white, solid product amorphous at the X-rays, having the appearance of a non-vulcanized elastomer, are obtained.

The product is completely extractable with boiling n-hexane. In the infra-red spectrum of said product there is a band at 11.20 microns which shows the presence of double bonds of vinylidenic type. From the infra-red spectrum it can be concluded that this copolymer contains about 6.8 percent by weight of 2-methyl-1,4-pentadiene.

The ethylene-propylene-2-methyl-1,4-pentadiene terpolymer is vulcanized with the same mixes and modalities as in Example XI.

The product vulcanized in the absence of HAF carbon black presents the following characteristics:

| | |
|---|---|
| tensile strength | 20 kg/cm² |
| elongation at break | 400% |
| modulus at 300% | 14 kg/cm² |
| set at break | 5% |

The product vulcanized with HAF carbon black presents the following characteristics:

| | |
|---|---|
| tensile strength | 211 kg/cm² |
| elongation at break | 370% |
| modulus at 300% elongation | 131 kg/cm² |
| set at break | 8% |

EXAMPLE XIII

The run is carried out under the conditions of Example I, but 3,7-dimethyl-1,6-octadiene is used as comonomer instead of 1,5-hexadiene. The catalyst is prepared and the product is purified and isolated as described in Example I.

It amounts to 12 g of a white, solid which has a rubbery appearance and is amorphous by X-ray examination.

It is completely extractable with boiling n-hexane.

100 parts by weight of the ethylene-propylene-3,7-dimethyl-1,6-octadiene terpolymer are mixed in a laboratory roll mixer with one part phenyl beta-naphthylamine, 2 parts lauric acid, 5 parts zinc oxide, 2 parts sulfur, one part tetramethylthiuram disulfide and 0.5 parts mercaptobenzothiazole.

The mix is then vulcanized in a press at 150°C for 30 minutes; from the vulcanized sheet specimens are cut for the ASTM D–412–51 T test, which gives the following values, determined at 25°C:

| | |
|---|---|
| tensile strength | 29 kg/cm² |
| elongation at break | 660% |
| modulus at 300% elongation | 10 kg/cm² |
| set at break | 10% |

EXAMPLE XIV

Using the same apparatus as in Example IV, at the temperature of −20°C, 50 ml anhydrous n-heptane and 15 ml 2-methyl-1,4-pentadiene are introduced into the flask and a slow stream of ethylene is bubbled through.

The catalyst is prepared at −20°C by mixing a solution of 7 millimols aluminum diethyl monochloride in 20 ml anhydrous toluene with a solution of 1.4 millimols vanadyl monochloro acetylacetonate in 20 ml anhydrous toluene.

The catalyst thus prepared is introduced into the flask after 30 seconds. The ethylene stream is continued. After 25 minutes from the introduction of the catalyst the reaction is stopped by adding 20 ml methanol containing 0.1 g phenylnaphthylamine. The product is purified by treating it successively, in a nitrogen atmosphere, with aqueous hydrochloric acid and water, and is then coagulated with methanol.

5g of a solid, rubbery product are obtained, which is amorphous at X-rays. In the IR spectrum the band at about 11.25 microns which is attributable to vinylidene bonds, is clearly visible.

EXAMPLE XV

The reaction apparatus of Example I is used, the temperature being maintained at −20°C. 350 cc anhydrous n-heptane are introduced in the glass cylinder and are saturated with a propylene-ethylene gas mixture, which contains the two monomers in a propylene to ethylene molar ratio of 3:1, circulated at a flowrate of 200 l/h. 15 cc 1,5-heptadiene are added.

The catalyst is prepared at −20°c, in nitrogen, by admixture of a solution containing 14 millimols aluminum diethyl monochloride in 20 cc anhydrous toluene with a solution containing 2.8 millimols vanadium triacetylacetonate in 20 cc anhydrous toluene. The thus prepared catalyst is aged for 5 minutes at −20°C and then is injected into the reaction apparatus under nitrogen pressure.

The monomer mixture is circulated now at the rate of 400 l/h.

After 12 minutes from the introduction of the catalyst, the reaction is stopped by addition of 20 cc methanol, containing 0.2 g phenyl-betanaphthylamine. The product is purified and isolated as described in Example 1.

After drying in vacuo, 6.3 g of a solid product, which is amorphous at the X-rays and completely soluble in boiling n-heptane, are obtained. The product has the appearance of unvulcanized rubber.

Infra-red analysis (10.35 micron band) shows that it contains 3 percent by weight 1,5-heptadiene.

Vulcanization of the polymerizate at 150°C for 30 minutes, in a mix containing, for 100 parts by weight of it, 5 parts zinc oxide, 1 part phenyl-beta-naphthylamine, 2 parts lauric acid, 2 parts sulfur, 0.5 parts mercaptobenzothiazole and 1 part tetramethylthiuram disulphide, yields a product showing the following properties:

| | |
|---|---|
| tensile strength | 17 kg/cm$^2$ |
| elongation at break | 380% |
| modulus at 300% | 12.2 kg/cm$^2$ |
| set at break | 4% |

EXAMPLE XVI

The reaction apparatus consists of a 750 cc glass cylinder, having an inner diameter of 5.5 cm, provided with tubes for the introduction and the discharge of gases, and with a mechanical agitator and a thermometer sheath. The tube for the introduction of the gases reaches the bottom of the reaction tube and ends with a porous diaphragm (diameter 3.5 cm). The apparatus is kept at a constant temperature of −20°C. 200 cc of anhydrous n-heptane are introduced, and this solvent is then saturated at −20°C by passing through it a 4:1 molar mixture of propylene and ethylene, with a flowrate of 250 normal liters per hour (Nl/h).

0.084 mole (10cc) of 1,5-hexadiene (diallyl) are then introduced. During this time, a catalyst is prepared at a temperature of −20°C by mixing a solution of 7 millimoles of diethyl aluminum monochloride in 20 cc of anhydrous toluene with a solution of vanadium trichloride di(trimethylaminate), $VCl_3 \cdot [(CH_3)N]_2$, in 20 cc of toluene. The catalyst is introduced into the reaction apparatus about one minute after its preparation. The ethylene-propylene mixture is continuously fed with a flowrate of 250 normal liters per hour (as determined at 25°C and 1 atmosphere). Twenty minutes after the introduction of the catalyst the reaction is stopped by the addition of 20 cc methanol containing 0.2 g of an antioxidant, phenyl-beta-naphthylamine. The product is purified by successive treatments under nitrogen with aqueous hydrochloric acid and water. Then, the product is completely coagulated with an excess of a mixture of acetone and methanol. The product is dried under vacuum and amounts of 9 g of a white solid, having a rubbery appearance, and is completely amorphous as shown by X-ray examination, is obtained. It has an intrinsic viscosity, as measured in toluene at 30°C, of 2.13, and is completely extractable with boiling n-heptane. By examining the infra-red spectrum of this product it is possible to see the bands of the unsaturation at about 6.08 microns and bands at 10 and 11 microns which demonstrate the presence of double bonds of the vinyl type. Such infra-red examination indicates that the copolymer contains about 5 percent by weight of 1,5-hexadiene.

100 parts by weight of the above terpolymer ethylene-propylene-hexadiene-1,5 are mixed in a laboratory roll mixer with one part of phenyl-beta-naphthylamine, 2 parts of lauric acid, 5 parts of zinc oxide, 2 parts of sulfur, one part tetramethylthiuram disulfide, and 0.5 parts mercaptobenzothiazole.

The mixture is then vulcanized in a press for 30 minutes at 150°C. Specimens are taken from the vulcanized sheet and are subjected to ASTM D-412-51 T test. The following values, determined at 25°C, are obtained.

| | |
|---|---|
| tensile strength | 34 kg/cm$^2$ |
| elongation at break | 510% |
| modulus at 300% elongation | 15.0 kg/cm$^2$ |
| permanent set at break | 8% |

EXAMPLE XVII

The run is carried out under the same conditions as described in Example XVI, however, 2-methyl-1,4-pentadiene is used as a comonomer instead of 1,5-hexadiene.

Into the reaction apparatus containing 200 cc n-heptane, saturated at −20°C with a gaseous mixture of 4:1 molar ratio of propylene to ethylene, 10 cc of 2-methyl-1,4-pentadiene are introduced. The catalyst is prepared according to the procedure described in Example XVI.

20 minutes after the introduction of the catalyst the reaction is stopped by addition of 20 cc methanol containing 0.2 g antioxidant (phenyl-beta-naphthylamine). The product is purified and separated as in Example I, and results in 11 g of a white solid, having a rubbery appearance, which is amorphous as determined by X-ray examination. It has an intrinsic viscosity, measured in toluene at 30°C, equal to 2.26 and is completely extractable with boiling n-hexane.

In the infra-red spectrum of this product, bands at 11.20 microns are seen, which demonstrates the presence of double bonds of the vinylidene type. From the infra-red examination one concludes that this copolymer contains about 4.2 percent by weight of 2-methyl-1,4-pentadiene.

100 parts by weight of the ethylene-propylene-2-methyl-1,4-pentadiene terpolymer are mixed, in a laboratory roll mixer, with one part of phenyl-beta-naphthylamine, 2 parts of lauric acid, 5 parts of zinc oxide, 0.5 parts of mercaptobenzothiazole, 1 part tetramethylthiuram disulfide and 2 parts of sulfur.

The mix is vulcanized in a press for 30 minutes at 150°C, and a vulcanized sheet is obtained having the following characteristics:

| | |
|---|---|
| tensile strength | 24 kg/cm² |
| elongation at break | 465% |
| modulus at 300% elongation | 11.8 kg/cm² |
| permanent set at break | 10% |

EXAMPLE XVIII

The run is carried out under the same conditions as described in Example XVI. Into the reaction apparatus, which contains 200 cc n-heptane, saturated at −20°C with a gaseous propylene-ethylene mixture in the molar ratio 4:1, 10 cc of 2-methyl-1,4-pentadiene are introduced.

The catalyst is prepared at a temperature of −20°C by mixing a solution of 14 millimols of diethyl aluminum monochloride in 20 cc anhydrous toluene with a solution of 1.4 millimols of vanadium trichloride di(-trimethylaminate) in 20 cc of toluene and is introduced into the reaction apparatus 30 seconds after its preparation. 25 minutes after the introduction of the catalyst the reaction is stopped by addition of 20 cc methanol containing 0.2 of antioxidant (phenyl-beta-naphthylamine).

The product is purified and separated as described in Example I. 10 g of terpolymer ethylene-propylene-2-methyl-1,4-pentadiene are obtained. The product is a solid, having a rubbery appearance, and is amorphous at the X-rays.

In the infra-red spectrum of said product the unsaturation bands of vinylidene type at 1.2 microns are clearly visible.

The ethylene-propylene-2-methyl-1,4-pentadiene terpolymer thus obtained is vulcanized as described in Example I and gives a vulcanized sheet having the following characteristics:

| | |
|---|---|
| tensile strength | 33 kg/cm² |
| elongation at break | 460% |
| modulus at 300% elongation | 15.2 kg/cm² |
| permanent set at break | 8% |

EXAMPLE XIX

Into the reaction apparatus described in Example XVI, which apparatus has been previously deaerated and kept at a constant temperature of −20°C, 350 cc n-heptane are introduced under nitrogen. This solvent is then saturated at −20°C by passing through it a propylene-ethylene gaseous mixture in a molar ratio of 4:1, with a flowrate of 250 Nl/h, (normal liters per hour). 0.168 moles (20cc) 1,5-hexadiene are then added. The catalyst is prepared at −20°C by mixing a solution of 14 millimoles of diethyl aluminum monochloride in 20 cc of anhydrous toluene with a solution of 2.8 millimoles of vanadium trichloride tripyridinate VCl₃. (C₅H₅N)₃, in 20 cc of toluene.

The catalyst is introduced into the reaction apparatus about one minute after its preparation. The ethylene-propylene mixture is continuously fed with a flowrate of 250 Nl/h. 15 minutes after the introduction of the catalyst the reaction is stopped by addition of 20 cc methanol containing 0.2 g of antioxidant (phenyl-beta-naphthylamine). The product is purified and separated as described in Example I, and amounts to 20 g of a white solid, having a rubbery appearance, and is amorphous as shown by X-ray examination. It has an intrinsic viscosity, measured in toluene at 30°C, equal to 1.8, and is completely extractable with boiling n-hexane.

The infra-red spectrum of this product shows the presence of bands indicating unsaturations of the vinyl type.

100 parts by weight of the ethylene-propylene-1,5-hexadiene terpolymer are mixed in a laboratory roll mixer with one part of phenyl-beta-naphthylamine, 2 parts of lauric acid, 5 parts of zinc oxide, 2 parts sulfur, one part tetramethylthiuram disulfide, and 0.5 parts mercaptobenzothiazole.

The mixture is vulcanized in a press for 30 minutes at 150°C; from the vulcanized layer specimens are taken for the ASTM D-412-51T test and the following values are obtained:

| | |
|---|---|
| tensile strength | 38 kg/cm² |
| elongation at break | 620% |
| modulus at 300% elongation | 14 kg/cm² |
| permanent set at break | 11% |

EXAMPLE XX

The run is carried out under the same conditions as described in Example XIX, but 2-methyl-1,5-hexadiene is used as a comonomer instead of 1,5-hexadiene.

Into the reaction apparatus which contains 350 cc n-heptane, saturated at −20°C with propylene-ethylene gaseous mixture in a molar ratio of 4:1, 20 cc of 2-methyl-1,5-hexadiene are introduced. The catalyst is prepared as described in Example III. 20 minutes after the introduction of the catalyst, the reaction is stopped by addition of 20 cc methanol containing 0.2 g antioxidant (phenyl-beta-naphthylamine). The product is purified and separated as described in Example I, and amounts to 15 g of a white solid, having a rubbery appearance, and is amorphous as shown by X-ray examination.

In the infra-red spectrum of said product bands are visible at 11:20 microns, which demonstrates the presence of double bonds of the vinylidene type.

The ethylene-propylene-2-methyl-1,5-hexadiene terpolymer is vulcanized as described in Example IV and gives a vulcanized sheet having the following characteristics:

| | |
|---|---|
| tensile strength | 46 kg/cm² |
| elongation at break | 620% |
| modulus at 300% elongation | 11 kg/cm² |
| permanent set at break | 14% |

EXAMPLE XXI

The run is carried out under the same conditions as described in Example XVI, but vanadium trichloride tripyridinate, VCl₃.[C₅H₅N]₃, instead of vanadium trichloride di-(trimethylaminate), VCl₃[(CH₃)₃N]₂, is used in the preparation of the catalyst. After 30 minutes 9 g of ethylene-propylene-2-methyl-1,4-pentadiene terpolymer are obtained.

The product is a solid, has a rubbery appearance, and is amorphous as shown by X-ray examination.

In the infrared spectrum of this product there were clearly visible bands corresponding to unsaturations of the vinylidene type at 11.2 microns.

EXAMPLE XXII

Into the reaction apparatus described in Example XVI, kept at −20°C, 350 cc anhydrous n-heptane and 20 cc 2-methyl pentadiene-1,4 are introduced. Through the gas inlet tube a propylene-ethylene mixture in a molar ratio of 4:1 is introduced and circulated at a flowrate of 200 Nl/h (normal liters per hour). The catalyst is prepared in a 100 cc flask, at −20°C under nitrogen atmosphere, by reacting in 30 cc anhydrous toluene 1 millimole of vanadium tetrachloride bis-pyridinate, $(C_5H_5N)_2 \cdot VCl_4$, and 5 millimoles of diethyl aluminum monochloride. The catalyst thus prepared is kept at −20°C for 5 minutes and is then siphoned into the reactor by means of nitrogen pressure. The ethylene-propylene mixture is continuously introduced and discharged at a rate of 400 Nl/h. Ten minutes after the beginning the reaction is stopped by adding 20 cc methanol containing 0.1 g phenyl-beta-naphthylamine.

The product is purified and isolated as described in Example I. After vacuum drying 11 g of solid product are obtained, which is amorphous at the X-rays, has the appearance of a non-vulcanized elastomer and is completely soluble in boiling n-heptane. The infra-red examination shows the presence of vinylidene type double bonds (band at 11.2 microns).

The ethylene-propylene-2-methyl pentadiene-1,4-terpolymer is vulcanized as described in Example I. The vulcanized product has the following characteristics:

| | |
|---|---|
| tensile strength | 28 kg/cm² |
| elongation at break | 380% |
| modulus at 300% | 13 kg/cm² |
| permanent set at break | 6% |

EXAMPLE XXIII 1,000 cc of liquid propylene and 60 cc of 2-methyl-octadiene-1,7 are introduced into a reaction apparatus consisting of a 1.5 liter glass autoclave provided with an agitator with a gas feeding pipe, kept at −10°C. Ethylene is introduced up to a pressure increase of 0.9 atm. Through two separate metering devices the catalyst components are introduced into the reactor: first 10 millimoles of aluminum diethyl monochloride dissolved in 10 cc of anhydrous n-heptane and then 2 millimoles of vanadium triacetylacetonate dissolved in 2 cc of anhydrous toluene.

The polymerization starts immediately with the formation of a product insoluble in the reaction medium. The temperature is kept at −10°C and the pressure is kept constant by feeding an ethylene amount corresponding to that absorbed during the polymerization.

After 60 minutes, the reaction is stopped. The olefins are removed and the product is purified in a separating funnel by repeated treatments with aqueous hydrochloric acid and then with water, and is coagulated with acetone. After vacuum drying, 49 g of a solid product which is amorphous on X-ray examination, looks like a non-vulcanized elastomer and is completely soluble in boiling n-heptane are obtained.

The infra-red spectrographic examination shows the presence of unsaturations of vinylidene type (band at 11.20 microns) in amount corresponding to 2.7 percent by weight. The propylene content is 57 percent by weight.

100 parts by weight of the terpolymer are mixed in a roll mixer with 50 parts of carbon black HAF, 1 part of phenyl-beta-naphthylamine, 2 parts sulfur, 5 parts zinc oxide, 1 part tetramethylthiuram disulfide, and 0.5 parts of mercaptobenzothiazole. The mixture is vulcanized in a press at 150°C for 60 minutes.

A vulcanized lamina having the following characteristics is thus obtained:

| | |
|---|---|
| tensile strength | 239 kg/cm² |
| elongation at break | 465% |
| modulus at 300% | 147 kg/cm² |
| permanent set | 8.5% |

EXAMPLE XXIV 2.8 liters of liquid propylene and 1,150 cc of 2-methyl-pentadiene-1,4 are introduced into a 6 liter stainless steel autoclave provided with comb agitator, bottom discharge and wall cooling by means of liquid $NH_3$. The temperature is adjusted at −10°C and the solution is saturated with ethylene up to an over-pressure of 0.7 atm. Through two separate metering devices the catalyst components are introduced into the autoclave: first 28 millimoles of aluminum diethyl monochloride dissolved in 28 cc of anhydrous n-heptane and then 4 millimoles of vanadium triacetylacetonate dissolved in 4 cc of anhydrous toluene.

The temperature is kept at −10°C and the pressure is kept constant by feeding an ethylene amount corresponding to that absorbed during the polymerization.

After 4 hours and 20 minutes, the polymerization is stopped. The unreacted propylene is removed with steam, the polymer is dried in a colander while adding 0.2 percent by weight of stabilizer [2,2'-methylene-bis(4-ethyl-6-tert. butyl-phenol)].

580 g of a solid product which is amorphous on X-ray examination, looks like a non-vulcanized elastomer and is completely soluble in boiling n-heptane are obtained. The infra-red spectrographic examination shows the presence of vinylidenic unsaturation (band at 11.2 microns).

The terpolymer is vulcanized with the mix and the modalities of Example XXIII. A vulcanized lamina having the following characteristics is thus obtained:

| | |
|---|---|
| tensile strength | 178 kg/cm² |
| elongation at break | 540% |
| modulus at 300% | 90 kg/cm² |

The following run illustrates the results obtained by preparing the catalyst at 25°C and polymerizing the ethylene, aliphatic alpha-olefin, non-conjugated diolefin mixture at 25°C, even when the catalyst is prepared from a catalyst according to the present invention.

The run is carried out under the same conditions as described in Example XVI, but both the preparation of the catalyst and the polymerization are carried out at a temperature of 25°C instead of −20°C. Into the reaction apparatus, kept at a constant temperature of 25°C, 350 cc n-heptane are introduced and then this solvent is saturated at 25°C by passing through it a mixture containing propylene-ethylene in a molar ratio of 4:1, with a flowrate of 250 Nl/h. 20 cc methyl-1,4-pentadiene are then introduced. The catalyst is prepared at 25°C by mixing a solution of 14 millimoles of diethyl aluminum monochloride in 20 cc of anhydrous toluene with a solution of 2.8 millimoles of vanadium trichloride tripyridinate, $VCl_3[C_5H_5N]_3$, in 20 cc of anhydrous toluene.

The catalyst is introduced into the reaction apparatus as soon as it has been prepared. The ethylene-propylene mixture is continuously fed at the flowrate of 250 Nl/h. 27 minutes after the introduction, an amount of catalyst equal to the initial amount and prepared according to the indicated procedure is added. After one hour, the reaction is stopped by addititon of 20 cc of methanol containing 0.2 g antioxidant (phenyl-beta-naphthylamine).

The product is purified and separated as described in Example I.

0.4 g of a low molecular weight product having an oily appearance is obtained. The thus obtained product does not possess the properties of an elastomer.

This application is a continuation-in-part of our applications Ser. No. 151,206 filed Nov. 9, 1961, Ser. No. 243,728 filed Dec. 11, 1962, and Ser. No. 485,933 filed Sept. 8, 1965.

Some changes and modifications can be made in practicing the invention as described, without departing from its spirit and, therefore, it is intended to include in the scope of the appended claims all such variations in details as may be apparent to those skilled in the art from the description and working examples given herein.

What is claimed is:

1. A process for producing elastomeric copolymers of non-conjugated diolefins containing at least one terminal unsaturation of vinyl type and from five to 15 carbon atoms with at least one monoolefin selected from the group consisting of ethylene and aliphatic alpha-olefins containing from three to eight carbon atoms, said copolymers being essentially linear and amorphous under X-rays examination, completely extractable with boiling n-heptane, made up of macromolecules containing copolymerized units of all of the starting monomers and in which practically all of the copolymerized diolefin units are polymerized 1, 2 and have unsaturations in side groups, said copolymers having a molecular weight higher than 20,000 and being readily sulfur-vulcanizable to synthetic rubbers having low deformation at break, which process comprises copolymerizing a mixture of the monomers, one of which is a non-conjugated diolefin, in a reaction mixture which consists essentially of the monomers mixture in the liquid state or consists of an inert hydrocarbon solvent, in contact with a catalyst prepared by mixing hydrocarbon-soluble compounds of vanadium selected from the group consisting of vanadium triacetylacetonate, vanadyl diacetylacetonate, vanadyl halogen-acetylacetonates, tetrahydrofuranates and dialkyl etherates of vanadium trichloride, vanadium tetrachloride and vanadyl trichloride, and pyridinates, aminates and quinolinates of vanadium trichloride, vanadium tetrachloride and vanadyl trichloride, with at least one alkyl metal halide selected from the group consisting of dialkyl aluminum halides and alkyl aluminum dihalides in which the alkyl groups contain from one to six carbon atoms, in a molar ratio of the alkyl metal halide to vanadium compound comprised between two and 30, both the preparation of the catalyst and the copolymerization being carried out at a temperature between −80°C and 0°C, and the concentration of the monomers to be copolymerized being maintained substantially constant during the copolymerization reaction.

2. The process according to claim 1, characterized in that ethylene, propylene and the non-conjugated diolefin are copolymerized, and a molar ratio of propylene to ethylene of at least 4:1 is maintained in the liquid phase.

3. The process according to claim 1, characterized in that ethylene, butene-1 and the non-conjugated diolefin are copolymerized, and a butene-1 to ethylene molar ratio of at least 25:1 is maintained in the liquid phase.

4. The process according to claim 1, further characterized in that the alkyl metal compound is dialkyl aluminum monochloride and the molar ratio between the aluminum compound and vanadium compound is comprised between 2 and 30.

5. The process according to claim 1, characterized in that the polymerization is carried out in an inert solvent.

6. The process according to claim 1, characterized in that the polymerization is carried out continuously.

7. The process according to claim 1, characterized in that the copolymerization is carried out continuously by adding the catalyst components continuously to the copolymerizing system while maintaining constant the ratio between the concentrations of the monomers in the liquid phase.

8. The process according to claim 1, characterized in that the non-conjugated diolefin contains only one terminal double bond of the vinyl type, both the preparation of the catalyst and the copolymerization are carried out at a temperature between +10°C and −80°C, and the copolymerization is effected in the absence of inert solvents and using the monomers mixture maintained in the liquid state as the copolymerization medium.

9. The process of claim 1 in which the catalyst is prepared and the copolymerization is carried out at a temperature of from −50°C to −10°C.

* * * * *